Patented Jan. 9, 1951

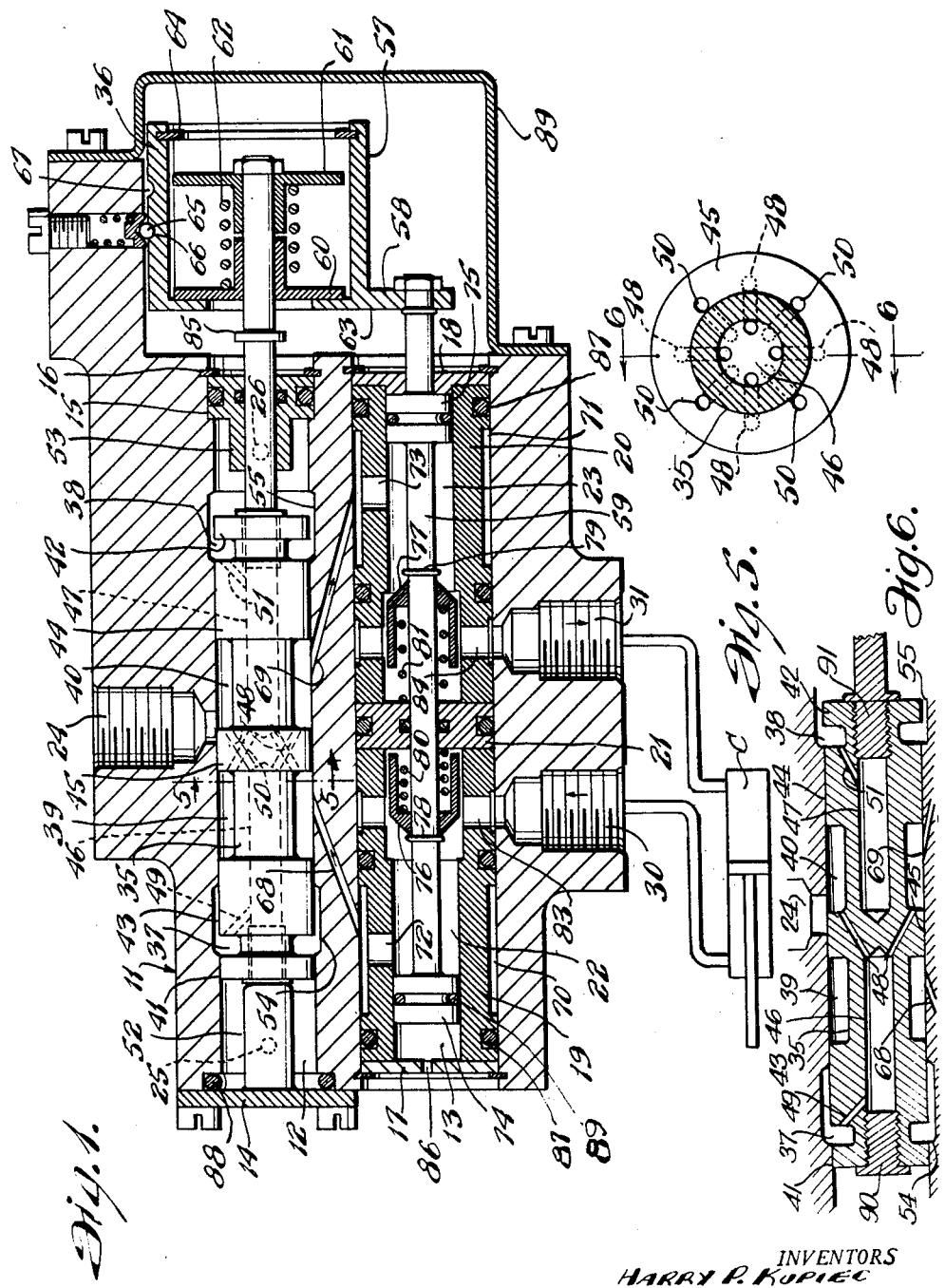

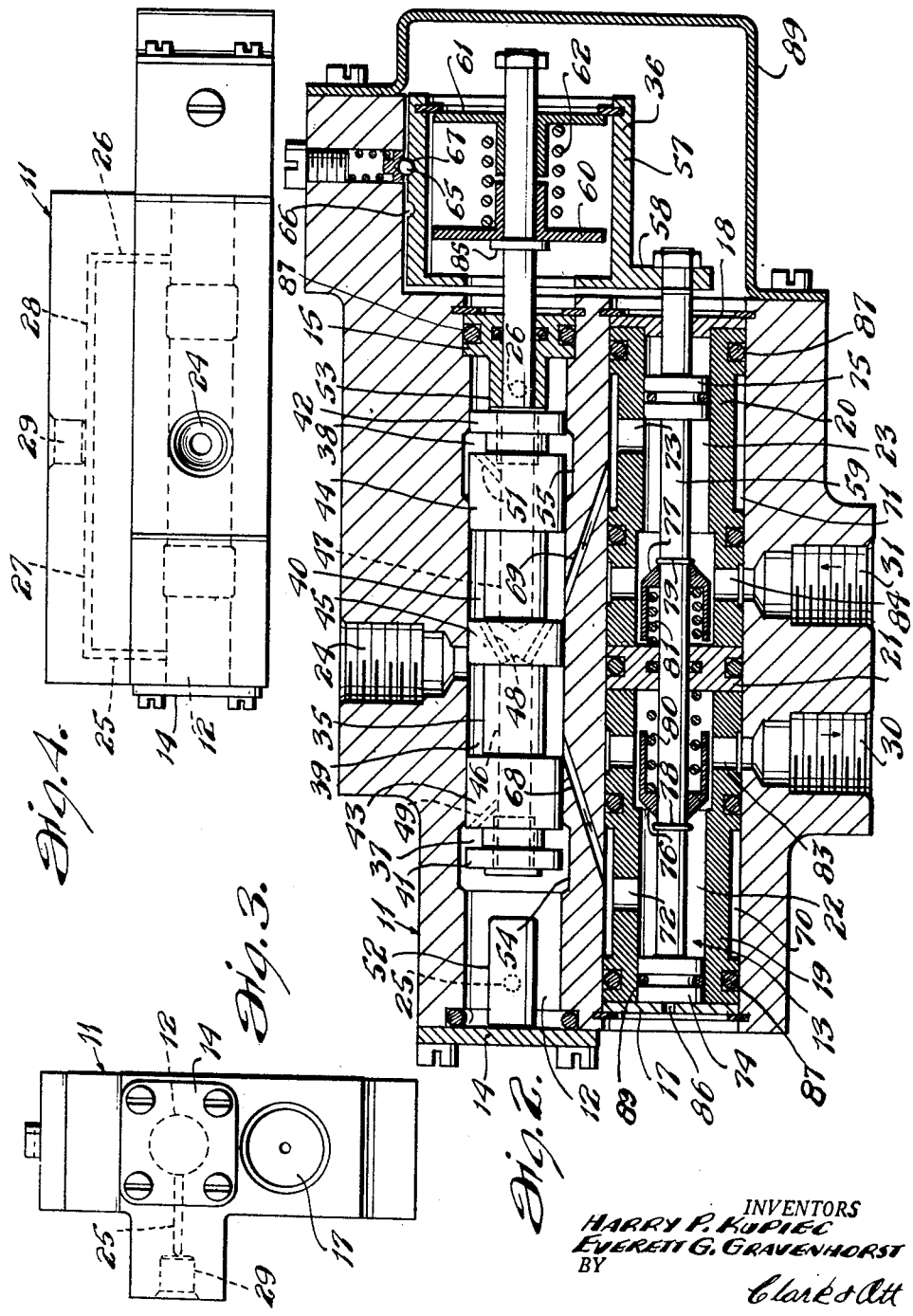

2,537,680

UNITED STATES PATENT OFFICE 2,537,680

PRESSURE ACTUATED DISTRIBUTING VALVE MEANS FOR MOTORS

Harry P. Kupiec, Paramus, N. J., and Everett G. Gravenhorst, Bronxville, N. Y., assignors to Air Associates, Inc., Teterboro, N. J., a corporation of New Jersey Application June 29, 1949, Serial No. 101,958

4 Claims. (Cl. 121—150)

This invention relates to a pressure actuated distributing valve means and while not limited thereto the same has particular application for moving an operational part of an aircraft and the like.

The invention has in view a pressure actuated distributing valve means which is constructed and arranged to reverse the direction of movement of the operational part in the event that the movement thereof in either direction is obstructed.

Another object of the invention is to provide a pressure actuated distributing valve means having passageways for the flow of fluid under pressure and the return flow thereof which pressure and return flows are instantaneously reversed in the passageways in the event that the movement of the operational part in either direction is obstructed to thereby reverse the movement of the operational part.

Still another object of the invention is to provide a pressure actuated distributing valve means which operates to reverse the direction of movement of the operational part when the back pressure of the return fluid in the passageway is reduced.

Another object of the invention is to provide a pressure actuated distributing valve means which is adapted to operate in systems utilizing standard aircraft pressures of 1,000 lbs. per square inch, 1,500 lbs. per square inch and 3,000 lbs. per square inch and in systems utilizing pressures therebetween and below 1,000 lbs. per square inch and above 3,000 lbs. per square inch.

With the foregoing and other objects in view, reference is now made to the following specification and accompanying drawings in which the preferred embodiment of the invention is illustrated.

In the drawings:

Fig. 1 is a longitudinal vertical sectional view of a pressure actuated distributing valve means constructed in accordance with the invention and illustrating the same with the parts thereof disposed in position for the flow of the fluid pressure and the return flow when an operating part is moved in one direction by the fluid pressure acting on the cylinder-piston unit conventionally represented.

Fig. 2 is a similar view showing the position of the parts for the flow of the fluid pressure when the operating part is moved by the fluid pressure in the opposite direction.

Fig. 3 is an end view of the pressure actuated distributing valve means.

Fig. 4 is a top plan view thereof.

Fig. 5 is a vertical sectional view taken approximately on line 5—5 of Fig. 1.

Fig. 6 is a longitudinal section through the piston valve taken approximately on line 6—6 of Fig. 5.

Referring to the drawings by characters of reference, the pressure actuated distributing valve means is adapted to be connected in a fluid pressure system with a pressure responsive device for controlling the movement in opposite directions of an operational part of a device such as a windshield wiper of aircraft and the like.

The pressure actuated distributing valve means includes a valve body 11 having aligned longitudinally extending bores 12 and 13 opening through the opposite ends thereof. The bore 12 is closed at one end by a plate 14 and at the opposite end by an apertured end wall 15 secured in position in the end of the bore by a snap ring 16. The bore 13 is closed at its opposite ends by plates 17 and 18 and located within the bore between said plates are cylindrical bushings 19 and 20 disposed in spaced relation and having an apertured wall 21 arranged therebetween to provide longitudinally extending cylindrical chambers 22 and 23 located on the opposite side of the apertured wall 21 and within the bushings 19 and 20 respectively.

The valve body 11 is provided with an inlet port 24 communicating at its inner end with the bore 12 and adjacent the opposite ends of said bore are outlet openings 25 and 26 which communicate with branch passageways 27 and 28 connecting with an outlet port 29. The valve body 11 is also provided with service ports 30 and 31 which communicate at their inner ends with the chambers 22 and 23 respectively. The ports 30 and 31 are adapted to be connected with the opposite ends of the pressure responsive device conventionally illustrated as a cylinder-piston unit C for imparting reciprocatory movement to an operational part of an aircraft and the like while the inlet port 24 is adapted to be connected with an hydraulic pressure supply with the outlet port 29 being connected with the return or low pressure side thereof.

A piston valve 35 is arranged in the bore 12 for longitudinal reciprocatory movement therein with the forward end of said piston slidably protruding through the apertured member 15 and secured to a tensioning head 36. The piston valve 35 is cut away or reduced in diameter at longitudinally spaced portions so as to form peripheral recesses 37, 38, 39 and 40 between the wall of the bore 12 and the peripheral faces of the recessed portions and to provide peripheral lands 41 and 42 adjacent the opposite ends of said bore and intermediate lands 43 and 44 and a centrally located land 45 which lands slidably fit the wall of the bore. The land 45 is spaced from the lands 43 and 44 by the recesses 39 and 40 while the lands 41 and 42 are spaced from the lands 43 and 44 respectively by the recesses 37 and 38. The piston valve 35 is formed with an axial bore 46 extending from the closed end 90 to the central land 45 and with an axial bore 47 extending from the closed end 91 to the central land 45. The bore 46 is in communication with the peripheral recess 40 through ducts 48 extending diagonally through the central land 45 with the outlet ends thereof opening through the side face of said land and at its opposite end the bore 46 is in communication with the peripheral recess 37 by ducts 49 extending through the land 43 with the outlet ends thereof opening through the side face of said land. The bore 47 is in communication with the peripheral recess 39 by ducts 50 extending through the land 45 with the outlet ends thereof opening through the side face of said land while at its opposite end the bore 47 is in communication with the peripheral recess 38 by ducts 51 extending through the land 44 with the outlet ends thereof opening through the side face of said land.

The bore 46 together with the ducts 48 and 49 form part of the passageway for the return flow of the fluid when the same is discharged through the outlet opening 25 and the bore 47 together with the ducts 50 and 51 form part of the passageway for the return flow of the fluid when the same is discharged through the outlet opening 26. The piston valve 35 has reciprocatory movement within the bore 12 between the lugs or stops 52 and 53 extending inwardly from the plate 14 and end wall 15 respectively. Adjacent said lugs, the wall of the bore 12 is recessed or enlarged as at 54 and 55 to permit of the flow of the return fluid from the ducts 49 past the endmost land 41 and the discharge thereof through the outlet opening 25 when the endmost land 42 is disposed against the lug or stop 53 and to permit of the flow of the return fluid from the ducts 51 past the endmost land 42 and the discharge thereof through the outlet opening 26 when the endmost land 41 is disposed against the lug or stop 52. When the endmost land 41 is disposed against the lug or stop 52 it shuts off the flow of the return fluid through the outlet opening 25 and when the endmost land 42 is disposed against the lug or stop 53 it shuts off the flow through the outer opening 26.

The tensioning head 36 consists of a cylindrical housing 57 having a depending projection 58 which is affixed to the outer end of a plunger 59 arranged for longitudinal reciprocatory movement within the bore 13. Located within the housing 57 are inner and outer flanged members 60 and 61 which are slidable on the outer end of the piston 35 and arranged in oppositely disposed relation with a coiled expansion spring 62 interposed therebetween. The spring 62 tensions said flanged members for movement of the piston valve 35 to opposite positions with reference to the inlet port 24. The tensioning head 36 is adapted to be moved with the movement of the plunger 59 to an inward position as illustrated in Fig. 2 of the drawings and to an outward position as illustrated in Fig. 1 of the drawings and to be releasably secured in said positions respectively by a spring detent 65 engaging in the detent recesses 66 and 67 respectively.

The peripheral recesses 39 and 40 are in communication with the chambers 22 and 23 respectively by diagonally extending passageways 68 and 69 in the wall between the bores 12 and 13 with the lower ends of said passageways opening into annular recesses 70 and 71 formed in the peripheries of the bushings 19 and 20. The bushings are provided with openings 72 and 73 respectively which open through the walls thereof into the chambers 22 and 23 and into the recesses 70 and 71.

The plunger 59 is formed with a plunger head 74 at the inner end thereof and a plunger head 75 adjacent the opposite end which slidably fit the inner peripheries of the bushings 19 and 20. Substantially centrally between said plunger heads, the plunger is slidable in the apertured wall 21 and on opposite sides of said wall are cylindrical slide valves 76 and 77 arranged thereon in oppositely disposed relation and slidable thereon between the apertured wall 21 and abutments 78 and 79 respectively. Coil springs 80 and 81 are disposed in surrounding relation with the plunger and tensioned between the apertured wall 21 and the inner end walls of said slide valves respectively.

When the piston valve 35 is moved to the left against the lug 52 the fluid pressure admitted through the inlet port 24 passes through the cylindrical recess 40 surrounding the piston 35 as shown in Fig. 1 of the drawings and thence through the passageway 69, recess 71, openings 73 and into the chamber 23 and thence through the opening 84 and service port 31 to one side of the pressure responsive device C which is connected with the operational part for moving the same in one direction. The return flow of the fluid from the pressure responsive device C enters the valve through the service port 30, thence through the opening 83 into the chamber 22, and then through the opening 72, recess 70, passageway 68 and into the cylindrical recess 39 surrounding the piston valve 35. The return fluid then flows through the ducts 50 and into the bore 47 in the piston valve and thence through the ducts 51 and outlet opening 26 and is discharged through the outlet port 29 to the low pressure side of the hydraulic pressure supply.

The flow of the fluid pressure into the chamber 23 is exerted against the inner face of the head 75 of the plunger 59 so as to move the same to the right as illustrated in Fig. 1 of the drawings. By this movement the abutment 78 engages the slide valve 76 and moves the same toward the right so as to uncover the opening 83 between the service port 30 and the chamber 22. The pressure of the fluid within the chamber 23 functions to move the slide valve 77 a slight distance away from the abutment 79 so as to permit the passage of the fluid pressure between the slide valve 77 and the inner periphery of the bushing 20 and thence through the opening 84 leading to the service port 31. The movement to the right of the plunger 59 moves the tensioning head 36 outwardly as indicated in Fig. 1 of the drawing until the spring detent 65 is engaged in the detent recess 66. The back pressure in the return flow against the outer side face of the land 44 retains the piston 35 in position. However, the inner flanged member 60 is moved outwardly with the tensioning head 36 so as to tension the spring 62 between the flanged members 60 and 61.

When the operational part has reached the end of its stroke, or is obstructed in its movement, the flow of the fluid pressure and the return flow ceases whereupon the back pressure of the return fluid acting on the outer side face of the land 44 is reduced so as to permit the spring 62 to shift the piston valve 35 from the position shown in Fig. 1 of the drawing to the position shown in Fig. 2 of the drawing. In this position the fluid pressure from the inlet port 24 and the return from the pressure responsive device C flow in the opposite direction from that hereinbefore described whereby the operational part is moved in the reverse direction or opposite to that hereinbefore described.

With the movement of the piston valve 35 to the right as indicated in Fig. 2 of the drawings, the outer flanged member 61 is moved outwardly against the snap ring 64. The flow of the fluid pressure into the chamber 22 exerts pressure against the inner face of the head 74 to move the plunger 59 to the left as indicated in Fig. 2 of the drawings. This moves the tensioning head 36 to the left. The movement of the tensioning head 36 to the left also moves the outer flanged member 61 inwardly therewith so as to tension the spring 62 against the flanged member 60 which is positioned against the shoulder 85 formed on the piston valve 35. This movement of the outer flanged member 61 tensions the spring 62 for effecting movement of the piston valve 35 to the left as shown in Fig. 1 of the drawings in the event that the operational part is obstructed in its movement or when the same reaches the end of its stroke to thereby reduce the back pressure of the return flow acting on the outer face of the land 43 whereupon the spring 62 functions to move the piston valve 35 to the left as described.

The plate 17 is provided with a vent opening 86 to permit air to pass into and out of the chamber 22 at the rear of the head 74 with the movement of the plunger 59. The cylindrical bushings 19 and 20 and the apertured wall 21 are formed with peripheral recesses in which packing rings 87 are arranged for preventing flow of the fluid pressure between said members and the wall of the bore 13. The end wall 15 is formed with a peripheral recess in which a packing ring 87 is arranged and a packing rang 88 is arranged between the plate 14 and the valve body 11 for preventing flow of the fluid pressure between said end wall 15 and the valve body and between the plate 14 and the valve body. The heads 74 and 75 of the plunger 59 are similarly provided with peripheral recesses in which packing rings 89 are arranged for preventing flow of the fluid between said heads and the inner wall of the bushings 19 and 20.

What is claimed is:

1. In a pressure actuated distributing valve means, a valve body having an upper elongated cavity, a lower elongated cavity, an inlet port and two branch outlet ports opening through the wall of said upper cavity, two service ports in communication with the lower cavity adapted to be connected with a fluid motor for operation by fluid received from one of said service ports and fluid returned through the other port and two passageways establishing communication between said cavities, a piston valve mounted for reciprocatory movement in said upper cavity and movable to opposite positions with reference to the inlet port for controlling the flow of fluid pressure from the inlet port through one of said service ports and the flow of the return fluid through the other service port and the discharge thereof through one of said branch outlet ports when the piston valve is in one position with reference to said inlet port and for reversing the flow of the fluid pressure and the flow of the return fluid through said service ports and the discharge of the return fluid through the other branch outlet port when the piston valve is in the other position with reference to said inlet port, a plunger mounted for reciprocatory movement in the lower cavity and movable to opposite positions by the fluid pressure, a tensioning head affixed to said plunger and having a housing into which one end of the piston valve extends, flanged members slidably arranged on said piston valve between limits thereon and between the ends of said housing, a spring interposed between said flanged members and tensioned by the movement of said plunger to said opposite positions for moving the piston to its opposite positions, and said piston valve having a head at each end against which the back pressure of the return fluid is exerted to retain the piston in said opposite positions respectively against the tension of said spring until the flow of the return fluid is interrupted to reduce the back pressure.

2. In a pressure actuated distributing valve means, a valve body having an upper elongated cavity, a lower elongated cavity, an inlet port and two branch outlet ports opening through the wall of said upper cavity, two service ports in communication with the lower cavity adapted to be connected with a fluid motor for operation by fluid received from one of said service ports and fluid returned through the other port and two passageways establishing communication between said cavities, a piston valve mounted for reciprocatory movement in said upper cavity and movable to opposite positions with reference to the inlet port for controlling the flow of fluid pressure from the inlet port through one of said service ports and the flow of the return fluid through the other service port and the discharge thereof through one of said branch outlet ports when the piston valve is in one position with reference to said inlet port and for reversing the flow of the fluid pressure and the flow of the return fluid through said service ports and the discharge of the return fluid through the other branch outlet port when the piston valve is in the other position with reference to said inlet port, said piston valve having spaced longitudinally extending internal passageways opening therethrough adjacent the center and at the opposite ends of said piston valve for the flow of the return fluid through one of said internal passageways when the piston valve is in one position with reference to said inlet port and through the other passageway when the piston valve is in the opposite position for discharge through said branch outlet ports respectively, a plunger mounted for reciprocatory movement in the lower cavity and movable to opposite positions by the fluid pressure, a tensioning head affixed to said plunger including a housing into which one end of the piston valve extends, flanged members slidably arranged on said piston valve between limits thereon and between the ends of said housing, and a spring interposed between said flanged members and tensioned by the movement of said plunger to said opposite positions for moving the piston valve to its opposite positions.

3. In a pressure actuated distributing valve means, a valve body having an upper elongated cavity, a lower elongated cavity, an inlet port and two branch outlet ports opening through the wall of said upper cavity, two service ports in communication with the lower cavity adapted to be connected with a fluid motor for operation by fluid received from one of said service ports and fluid returned through the other port and two passageways establishing communication between said cavities, a piston valve mounted for reciprocatory movement in said upper cavity and movable to opposite positions with reference to the inlet port for controlling the flow of fluid pressure from the inlet port through one of said service ports and the flow of the return fluid through the other service port and the discharge thereof through one of said branch outlet ports when the piston valve is in one position with reference to said inlet port and for reversing the flow of the fluid pressure and the flow of the return fluid through said service ports and the discharge of the return fluid through the other branch outlet port when the piston valve is in the other position with reference to said inlet port, said piston valve having spaced longitudinally extending internal passageways opening therethrough adjacent the center and at the opposite ends of said piston valve for the flow of the return fluid through one of said internal passageways when the piston valve is in one position with reference to said inlet port and through the other passageway when the piston valve is in the opposite position for discharge through said branch outlet ports respectively, a plunger mounted for reciprocatory movement in the lower cavity and movable to opposite positions by the fluid pressure, a tensioning head affixed to said plunger including a housing into which one end of the piston valve extends, flanged members slidably arranged on said piston valve between limits thereon and between the ends of said housing, a spring interposed between said flanged members and tensioned by the movement of said plunger to said opposite positions for moving the piston to its opposite positions, and said piston valve having a head at each end against which the back pressure of the return fluid is exerted to retain the piston valve in said opposite positions respectively against the tension of said spring until the flow of the return fluid is interrupted to reduce the back pressure.

4. In a pressure actuated distributing valve means, a valve body having elongated cavities, passageways establishing communication between said cavities, inlet and outlet ports communicating with one of said cavities, two service ports communicating with the other cavity, a piston valve and a plunger mounted for reciprocatory movement in said cavities for controlling the flow of fluid pressure in one direction from the inlet port through one of said service ports and the flow from the other service port through the outlet port, said plunger having a tensioning head affixed thereto into which one end of the piston valve extends, members slidably arranged on said piston valve between limits thereon and between stop elements carried by said valve body, a spring interposed between said members and tensioned by the movement of the plunger for moving the piston valve to opposite position for reversing the flow of fluid pressure through said service ports, and said piston valve having heads against which the back pressure of the fluid is exerted to return the piston valve to said opposite positions respectively against the tension of said spring until the flow of the fluid is interrupted to reduce the back pressure.

HARRY P. KUPIEC.
EVERETT G. GRAVENHORST.

REFERENCES CITED

The following references are of record in the file of this patent:

UNITED STATES PATENTS

| Number | Name | Date |
|---|---|---|
| 382,168 | Lechtenberg | May 1, 1888 |
| 2,223,792 | Muir | Dec. 3, 1940 |
| 2,302,232 | MacNeil | Nov. 17, 1942 |
| 2,342,450 | Campbell | Feb. 22, 1944 |